(12) United States Patent
Guirgis (10) Patent No.: US 7,497,361 B2
(45) Date of Patent: *Mar. 3, 2009

(54) PROCESS TO FRACTURE CONNECTING RODS AND THE LIKE WITH RESONANCE-FATIGUE

(76) Inventor: Sameh Guirgis, 4259 Tumbleweed Crescent, Windsor, Ontario (CA) N9G 3B9

( * ) Notice: Subject to any disclaimer, the term of this patent is extended or adjusted under 35 U.S.C. 154(b) by 0 days.

This patent is subject to a terminal disclaimer.

(21) Appl. No.: 11/487,593

(22) Filed: Jul. 17, 2006

(65) Prior Publication Data

US 2006/0289593 A1    Dec. 28, 2006

Related U.S. Application Data

(62) Division of application No. 10/751,817, filed on Jan. 6, 2004, now Pat. No. 7,143,915, which is a division of application No. 10/643,910, filed on Aug. 20, 2003, now abandoned, which is a division of application No. 09/599,409, filed on Jun. 22, 2000, now Pat. No. 6,644,529.

(30) Foreign Application Priority Data

Oct. 13, 1999 (CA) .................................. 2287140

(51) Int. Cl.
*B23P 17/02* (2006.01)
*B26F 3/00* (2006.01)

(52) U.S. Cl. .............................. 225/2; 225/94; 225/101; 29/888.09

(58) Field of Classification Search ...................... 225/1, 225/2, 93, 94, 96.5, 100, 101; 29/888.09
See application file for complete search history.

(56) References Cited

U.S. PATENT DOCUMENTS

| | | | | |
|---|---|---|---|---|
| 2,304,926 A | * | 12/1942 | Juvinall | 225/2 |
| 3,384,279 A | * | 5/1968 | Grechus | 225/2 |
| 3,751,080 A | * | 8/1973 | Bailey et al. | 29/888.092 |
| 3,994,054 A | * | 11/1976 | Cuddon-Fletcher et al. | 29/888.09 |
| 4,009,606 A | * | 3/1977 | Clebant et al. | 73/797 |
| 4,458,555 A | * | 7/1984 | Holtzberg et al. | 29/888.09 |
| 4,478,295 A | * | 10/1984 | Evans | 175/56 |
| 4,484,412 A | * | 11/1984 | Ishikawa | 451/28 |
| 4,530,246 A | * | 7/1985 | Pitman et al. | 73/799 |
| 4,569,109 A | * | 2/1986 | Fetouh | 29/888.09 |
| 4,585,152 A | * | 4/1986 | Sager | 225/1 |
| 4,693,139 A | * | 9/1987 | Mukai et al. | 29/888.09 |
| 4,768,694 A | * | 9/1988 | Fabris et al. | 225/94 |
| 4,860,419 A | * | 8/1989 | Hekman | 29/888.09 |
| 4,993,134 A | * | 2/1991 | Hoag et al. | 29/888.09 |
| 5,105,538 A | * | 4/1992 | Hoag et al. | 29/888.09 |

(Continued)

*Primary Examiner*—Stephen Choi (57) ABSTRACT

A process to fracture connecting rods and the like, that are made of high strength materials, comprises of the following mechanisms: (a) Fatigue: fluctuation of stresses in a pre-notched connecting rod due to the use of harmonic excitation will extend the notch tip in the connecting rod and will weaken the predetermined fracture plane by creating micro-cracks, (b) Resonance: resonance occurs when the frequency of the used harmonic excitation matches a natural frequency of the connecting rod, idealized as a structural system, (c) Pre-stressing forces: by applying pre-stressing forces acting in the same loading mode, the stresses in the connecting rod due to several force components can be superimposed, (d) Dynamic force: applying a dynamic force will raise the stress intensity factor, exceeding the fracture toughness of the material.

7 Claims, 5 Drawing Sheets

U.S. PATENT DOCUMENTS

| | | | |
|---|---|---|---|
| 5,115,564 A * | 5/1992 | Miessen et al. | 29/888.09 |
| 5,195,410 A * | 3/1993 | Young | 225/1 |
| 5,208,979 A * | 5/1993 | Schmidt | 29/888.09 |
| 5,263,622 A * | 11/1993 | Henzler et al. | 225/103 |
| 5,320,265 A * | 6/1994 | Becker | 225/104 |
| 5,503,317 A * | 4/1996 | Jones et al. | 225/103 |
| 5,507,093 A * | 4/1996 | Wittenstein et al. | 29/888.09 |
| 5,699,947 A * | 12/1997 | Cavallo et al. | 225/101 |
| 5,740,953 A * | 4/1998 | Smith et al. | 225/2 |
| 6,142,115 A * | 11/2000 | Haas et al. | 123/192.1 |
| 2003/0019100 A1* | 1/2003 | Hoffmann | 29/888.09 |

* cited by examiner

FIG. 7  OPENING MODE   SLIDING MODE   TEARING MODE

MODE 1

MODE 2

MODE 3

FIG. 6

PROCESS TO FRACTURE CONNECTING RODS AND THE LIKE WITH RESONANCE-FATIGUE

RELATED APPLICATIONS

This application is a divisional of application Ser. No. 10/751,817, filed on Jan. 6, 2004 now U.S. Pat. No. 7,143,915 which is a divisional of Ser. No. 10/643,910 filed Aug. 20, 2003 now abandoned, which is in turn a divisional of application Ser. No. 09/599,409, filed on Jun. 22, 2000, now U.S. Pat. No. 6,644,529 issued Nov. 11, 2003.

BACKGROUND OF THE INVENTION (I) Prior Art Background

Many methods have been used in fracturing connecting rods, that include:

(i) Passing an electron beam along a desired splitting plane as in U.S. Pat. No. 3,751,080.
(ii) Providing holes in the fracturing plane through which the fracturing force is introduced as in U.S. Pat. No. 3,994,054
(iii) Using heat treatment or freezing to embrittle the fracture area as in U.S. Pat. No. 4,768,694
(iv) Applying a static or an impulsive force acting perpendicular to the fracture plane as in U.S. Pat. Nos. 4,860,419; 5,115,564; and 5,320,265.
(v) Actuating expanding mandrels using a wedge arrangement as in U.S. Pat. No. 5,503,317.

However, most of the known methods for fracturing the connecting rods are based on the same principle: application of an "outward pressure" to the crank bore till the generated stresses are high enough to fracture the connecting rod. Some of these methods attempted to overcome the difficulty of fracturing such high strength material by reducing or weakening the cracking area, by using techniques, such as, the cryogenic cooling and the electron beam hardening, which have a deleterious effect on material performance.

Since connecting rods are made of high strength materials, the fracturing force is required to be of big magnitude. The use of big force has a negative effect on the quality of the fractured connecting rod, especially, with large size connecting rods in a high production environment. Despite the improvements, some disadvantages still exist such as: plastic deformation, lack of flexibility in adapting the same technique to different sizes of connecting rods, repeated breakage of force exertion elements of the machine, and poor quality of the fractured connecting rod. Moreover, some techniques are slow, costly, and technically very elaborate.

Before presenting the idea of the current invention, it is necessary to discuss the engineering principles on which the invention stands.

(II) Technical Background (A) Fracture Mechanics:

Strength failures of load bearing elements can be either of the yielding-dominant (ductile) or fracture-dominant (brittle) types. In case of a cracked element, it may fail due to reaching the plastic collapse or fracture condition. Collapse and fracture are competing conditions, and the one satisfied first will prevail.

High-strength materials are more likely to fail in fracture mode before attaining the plastic collapse strength. Since connecting rods are made of high-strength materials, they generally fail under tensile forces due to reaching the fracture limit state.

Fracture may take place under one of two conditions, namely, plane stress or plane strain, depending on the thickness of the element. In general, connecting rods are thick enough to sustain plane strain fracture. In the presence of a V-notch or a crack, fracture occurs under essentially elastic conditions with a limited plasticity zone at the tip of the crack.

The stress intensity factor (K), is the characterizing parameter for crack extension. For each stress pattern, there is a corresponding value of the stress intensity factor. When the stress intensity factor reaches a certain value, crack propagates and collapse by fracture occurs. That critical value of the stress intensity factor under plane strain conditions, called the Plane Strain Fracture Toughness ($K_{Ic}$), can be considered as a material property characterizing the crack resistance. Thus, the same value of $K_{Ic}$ should be obtained for a given material while testing specimens of different geometric shapes and sizes.

Lower temperature and faster strain rate decrease the plane strain fracture toughness for a specific material, while increasing the length of a pre-existing crack or decreasing the fracturing area will increase the stress intensity factor, if all other factors remain unchanged.

(B) Resonance of a Structural System:

The connecting rod, with all movement and rotation constraints imposed on it during the fracturing process, can be viewed as a structural system. Before explaining how to achieve and make use of a resonance condition in this fracturing technique, it is helpful to introduce the following definitions pertaining to an idealized structural system with finite number of degrees of freedom:

Degrees of freedom: the number of independent displacements required to define the displaced positions of all the masses relative to their original positions is called the number of degrees of freedom (DOFs).

Natural mode of vibration: a multi-degree-of freedom system (MDOF) would undergo simple harmonic motion, without a change of the deflected shape, if free vibration is initiated by appropriate distribution of displacements in various DOFs. In other words, for some characteristic deflected shapes, the system would vibrate in simple harmonic motion, and the initial shape would be maintained through out the motion. Each characteristic deflected shape ($\Phi_n$) is called a natural mode of vibration of the MDOF system.

Natural vibration properties: the time ($T_n$) required for a system to complete one cycle of the simple harmonic motion in one of its natural modes is called the natural period of that particular vibration mode. The corresponding natural cyclic frequency of vibration is $f_n$, and the natural circular frequency of vibration is $\omega_n$, where:

$$T_n = 2\pi/\omega_n = 1/f_n.$$

A vibrating system with N number of DOFs has N natural vibration frequencies $\omega_n$ (n=1, 2, . . . , N), arranged in sequence from smallest to largest ($\omega_1 < \omega_2 < \ldots < \omega_N$), with corresponding natural periods $T_n$, and natural modes $\Phi_n$.

The excitation frequency: the frequency of a harmonic force applied to a system is called the excitation frequency or the forcing frequency.

Damping: the process by which vibration steadily diminishes in amplitude is called damping.

SUMMARY OF THE INVENTION

The present invention employs a novel approach to fracture connecting rods. In this process, several factors are used to raise the stress intensity factor in the connecting rod up to the fracture point. Consequently, the use of single big force has been avoided with the application of several small magnitude forces. That eliminates many problems associated with the use of big forces. It also gives better control over the fracturing process, since the contribution of each factor is optimized to achieve the best results. For this process, a stress-riser should be provided in a prior process, using any of the known methods, in order to predetermine the fracture plane.

The present invention utilizes the following factors:

(a) Fatigue: if the stresses in a pre-notched connecting rod fluctuate due to the application of harmonic forces (or any time varying forces), the pre-existing crack (stress-riser) will extend incrementally depending on the range of fluctuation in the stress intensity factor. It is important to notice that the crack growth relates to the change of the stress intensity factor, not to its absolute value. Moreover, as the crack grows, the absolute value of stress intensity factor will increase.

(b) Resonance: during the fracturing process, the connecting rod will be in contact with many elements of the machine. These elements impose movement constraints, called geometrical boundary conditions, to the connecting rod. The connecting rod, with these boundary conditions, represents a distributed mass structural system, with an infinite number of degrees of freedom. However, it can be idealized and analyzed as a system with finite number of degrees of freedoms by using the finite element method.

If a MDOF structural system is subjected to an external force system, where the spatial distribution of the force components is independent of time, it takes a certain deformed shape. This shape does not necessarily resemble any of the natural vibration modes of the system. However, it has the same configuration as one of these natural modes, and with judicious selection of the external forces, the forced deformed shape can present a better approximation to that mode $\Phi_r$, which has a natural frequency $\omega_r$. In most cases, $\Phi_r$ is one of the first few natural modes.

If the force components have the same sinusoidal time variation, with a frequency that is the same as or close to the natural frequency $\Phi_r$, a resonance condition occurs. Consequently, the fluctuation range of the stress intensity factor and its maximum value increase substantially. The crack extends, and fracture may occur, depending on the relative magnitudes of stress intensity factor and material fracture toughness.

The aforementioned principle is applied in the present invention, where two harmonic forces, with the same amplitude and a phase angle of 180°, are applied simultaneously to two sides of the connecting rod. The two forces act along a straight line parallel to the predetermined fracture plane and perpendicular to the axis of the bore cylindrical surface. Moreover, the clamping arrangement allows free deformation of major part, centered on the V-notch, of each of the two webs defining the bore.

A suggested method, to apply the two harmonic forces, is to transform the rotary motion generated by a hydraulic motor to a couple of rotary motions, one clockwise and another anti-clockwise. These rotary motions can be transformed to linear motions using cam means, which transfer the pressure to the connecting rod through two contacts. The use of a single motor will guarantee that there is no time lag between the two equal but opposite forces.

(c) Pre-stressing forces: three pre-stressing forces are applied in the present invention. The primary one is applied by moving an upper jaw, which is part of the clamping arrangement, in a direction perpendicular to the predetermined fracture plane and away from it. This force works to eliminate the compression stress zones created by the harmonic forces and to decrease the deformation due to its application, giving more rigidity to the system. Eliminating the compression zones is favorable, since they deviate the fracture from predetermined plane.

The secondary pre-stressing forces are two static forces, equal in magnitude and acting on the same straight line in opposite directions, toward the bore axis. The same mechanism used to apply the harmonic forces can be used to apply these forces. Firstly, the two contacts advance till they slightly press the part applying the secondary pre-stressing forces, and secondly, they move forward and backward applying the harmonic forces.

These forces have clamping and damping actions. However, since they act in the same opening loading mode as the primary force, the stresses due to all of them can be superimposed. This will facilitate further reduction of the high magnitude fracturing forces.

Under the effect of the external forces, the deformed shape of the connecting rod changes with time. However, during each cycle, it passes through maximum and minimum deformation positions at time instants $T_{max}$ and $T_0$, respectively. The stress intensity factor corresponding to the harmonic forces has a maximum value at the maximum deformation position. Both of $T_0$ and $T_{max}$ can be determined analytically by knowing the characteristics of the forces.

(d) Dynamic force: a dynamic force is finally applied at a time instant $T_f$, by increasing the primary pre-stressing force suddenly as an impulsive force at $T_f$ or at a slower rate within a period centered on $T_f$. The time instant $T_f$ to be determined by performing several simple tests, by applying the fracturing force during different cycles at different time instants such as $T_0$ (minimum deformation) or $T_{max}$ (maximum $K_I$) and comparing the quality of the fractured connecting rods.

For example, if $T_0$ comes after 0.10 seconds from the beginning of each cycle, and the natural vibration period is 0.25 second, a test can be performed by applying an impulsive force at $T_0$ during the cycle 101 after 25.10 seconds from the beginning of the harmonic excitation. In another test, a dynamic force is applied during a period starting from the instant 25.05 seconds, and ending at the instant 25.15 seconds, measured from the beginning of the excitation. Similar tests are performed by applying the fracturing force during different cycles, and at different time instants, and by comparing the quality of the fractured connecting rods, $T_f$ is identified. However, a longer period before applying the dynamic force, increases the fatigue effect.

All of the external forces used in the aforementioned factors are in the same loading mode and, generally, stress the connecting rod within the linear elastic regime. Thus, the stress intensity factor due to their collective effect, $\Sigma K$, is obtained by adding the values of $K_I$ that correspond to each one of them, if applied individually. Fracture occurs when $\Sigma K_I = K_{Ic}$.

The flexibility of the external force system used in the current invention, makes the technique suitable for the wide variety of connecting rods types and sizes, starting from those intended for light duty applications such as lawnmowers and outboard marine engines, up to the most powerful combustion engines.

DESCRIPTION OF THE INVENTION

The following is a description of the two parts of the process, the stress analysis, and the process implementation:

(I) Stress Analysis

A stress analysis should be performed once for each type of connecting rods, using any appropriate computer software package according to the following steps:

(a) Creating a three dimensional solid model of the connecting rod.
(b) Idealizing the connecting rod as a structural system, using the solid model with the movements and rotation constraints that represents the geometrical boundary conditions, and determining the first few natural vibration frequencies and mode shapes of the system, using the finite element method.
(c) Determining the characterizing deformed shape of the system under the effect of a couple of harmonic forces with amplitude equal to unity, a primary pre-stressing force, and a couple of secondary pre-stressing forces, each with magnitude of unity, applying all simultaneously.
(d) Defining the natural mode shape Φr that has the same configuration as the deformed shape determined in step (c), and its corresponding natural frequency $\omega_r$.
(e) Determining the deformed shapes of the system under the effect of the forces described in step (c) applying each individually.
(f) Using the results of step (e), an optimum combination of the harmonic and pre-stressing forces is determined that produces a deformed shape closely resembling the modal shape $\Phi_r$.
(g) Determining the time instants $T_0$ and $T_{max}$, measured from the beginning of any harmonic cycle, where $T_0$ is the time instant at which the deformed shape of the connecting rod is the closest to its original shape, $T_{max}$ is the time instant at which the stress intensity factor, corresponding to the harmonic forces, has a maximum value.

Figure 1:
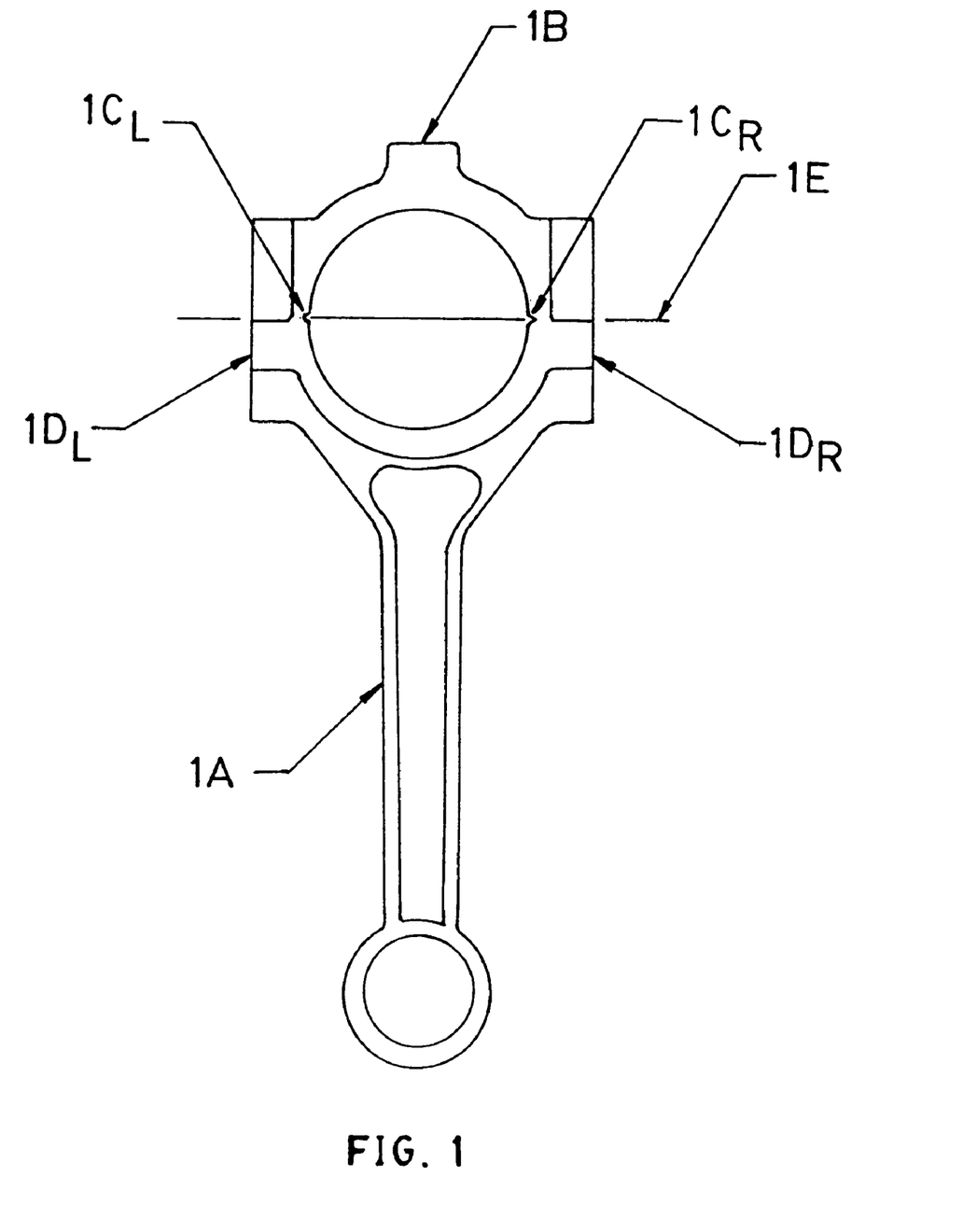
FIG. 1 shows the integrally formed connecting rod 1. It also shows the arrangements and the force exerting elements of the machine; where 2 is the upper jaw; 3 is the lower jaw; and 6; 7; 8; 9; 10; are other clamping elements.
Figure 2:
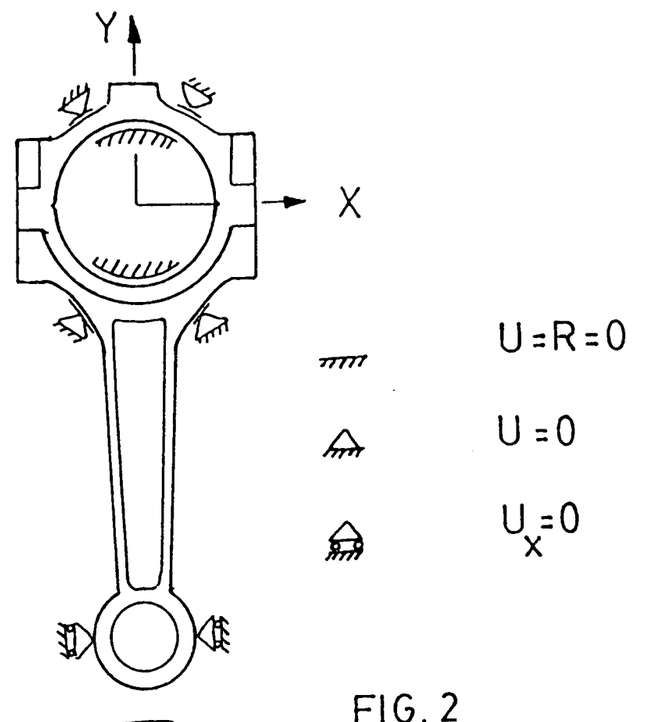
FIG. 2 shows an idealization of a connecting rod as a structural system.
Figure 3:
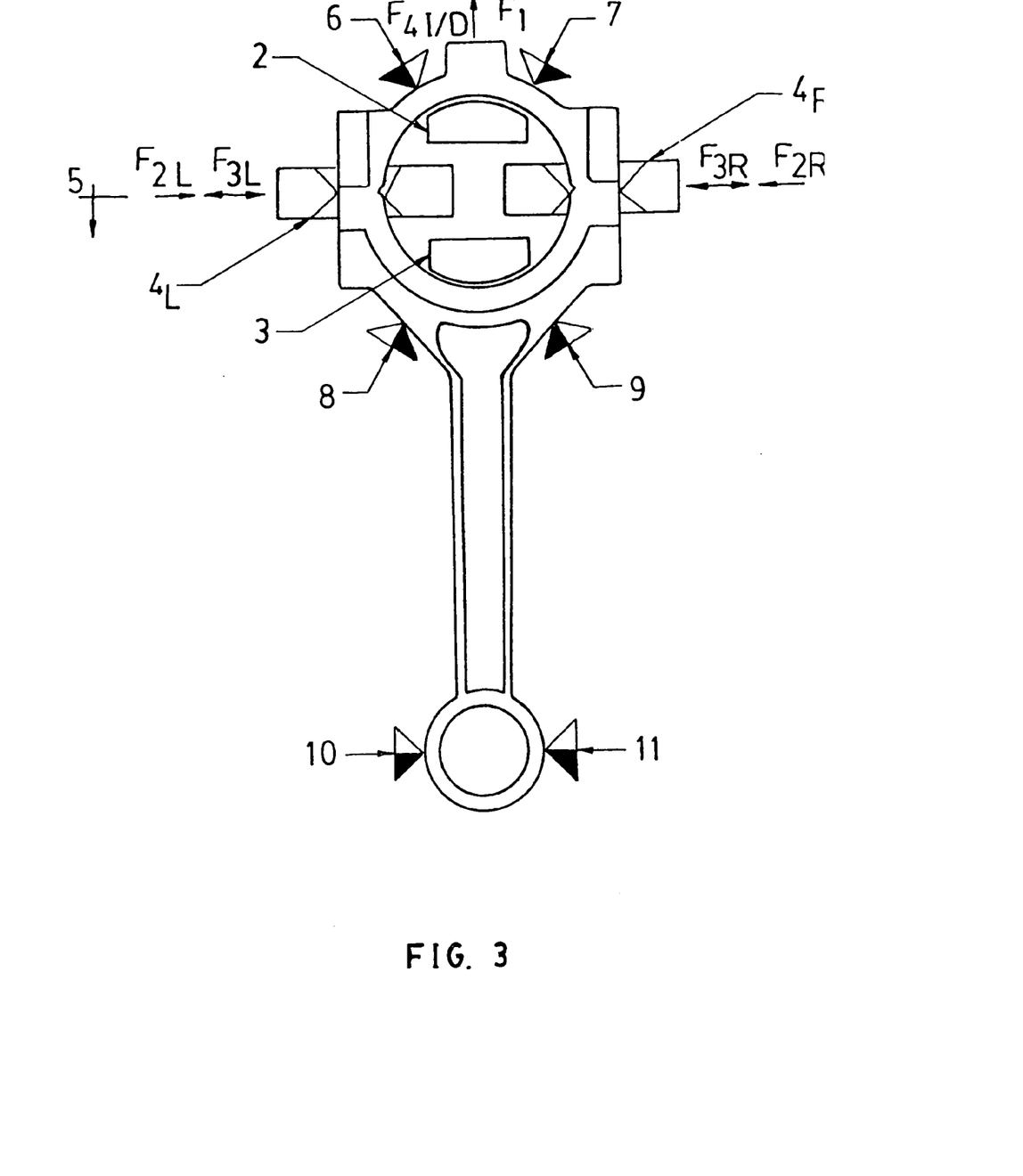
FIG. 3 shows the external force system used to fracture the connecting rod, where $F_1$ is the primary pre-stressing force; $F_{2L}$, $F_{2R}$ are the secondary pre-stressing forces; $F_{3L}$, $F_{3R}$ are the harmonic forces; and $F_{4I}$, $F_{4D}$ are the impulsive and the slow rate dynamic force, respectively..
Figure 4:
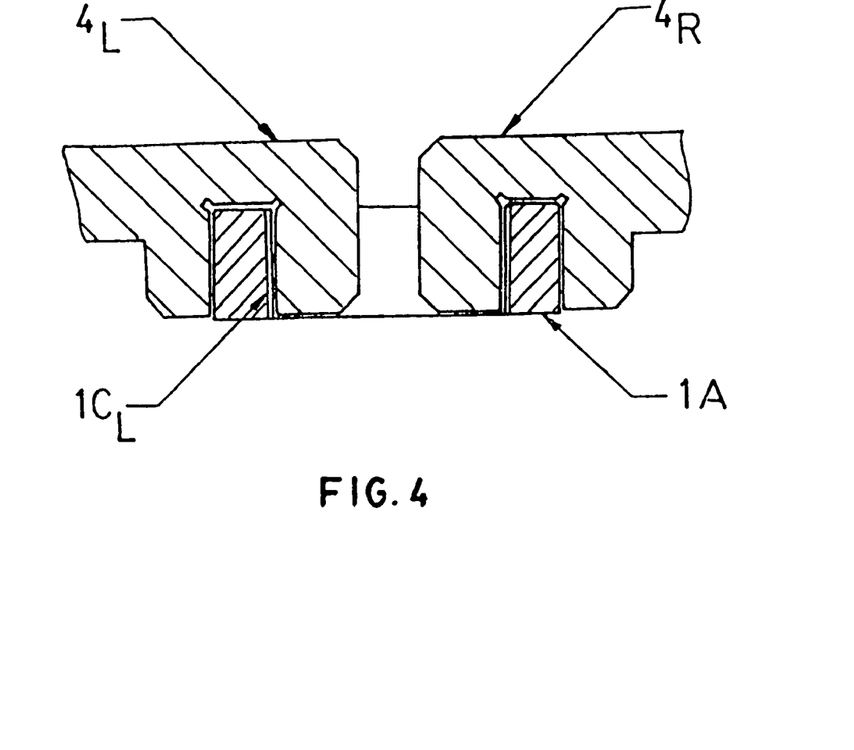
FIG. 4 is a cross sectional view taken along line 5 of FIG. 3.
Figure 5:
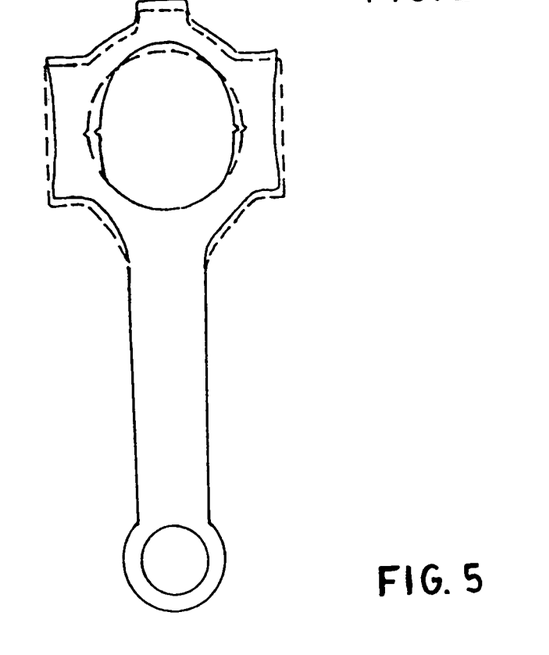
FIG. 5 shows the deformed shape of the connecting rod under the effect of the pre-stressing forces and the harmonic forces. The deformed configuration is exaggerated for clarity.
Figure 6:
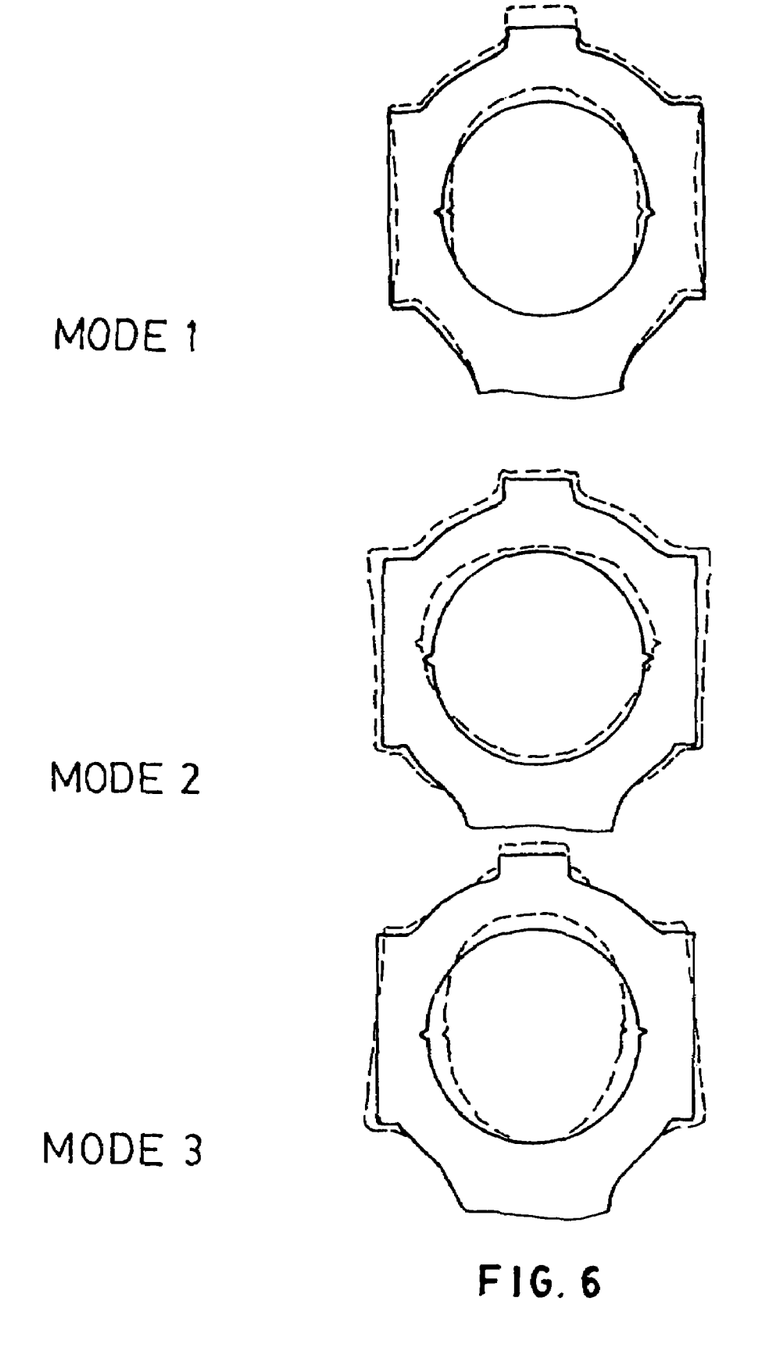
FIG. 6 shows the first three natural vibration modes of the idealized structural system. Notice how the first mode (Mode 1) has the same configuration of the deformed shape of the structure shown in FIG. 5.
Figure 7:
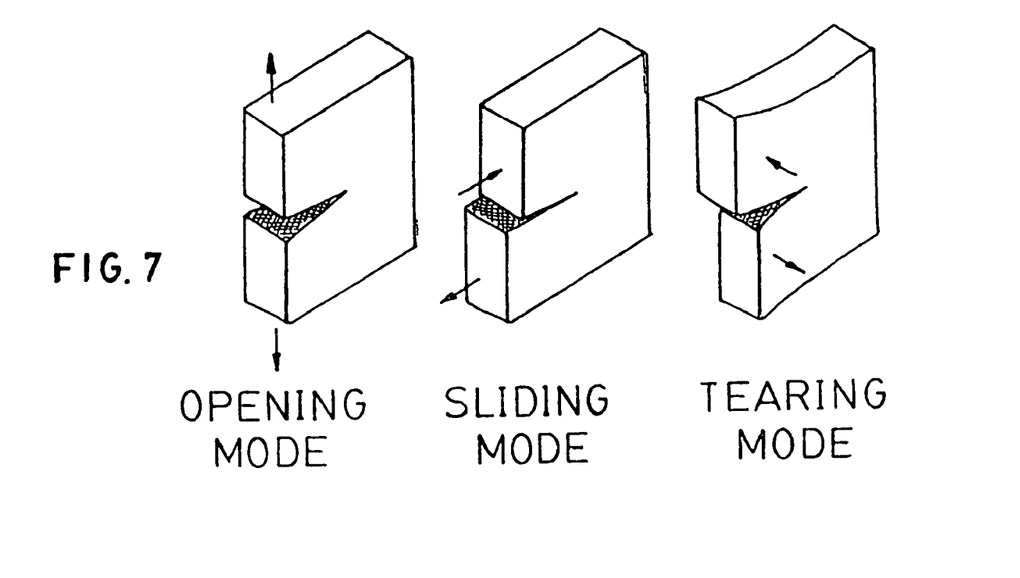
FIG. 7 shows the different modes of loading a cracked structural element, all forces used in this structural system are in the opening mode.

(II) Process Implementation:

Firstly, the connecting rod is clamped in position on the upper jaw 2, which is movable in direction perpendicular to the predetermined fracture plane, and on the lower jaw 3, which is stationary. Both jaws are in contact with the inside cylindrical surface of the bore, while other elements 6, 7, 8, and 9 are pressing the connecting rod surface against the two jaws. It is supported at points 10 and 11 as shown in FIG. 3. However, the exact locations of these points depend on connecting rod configuration and manufacturing requirements.

Secondly, the pre-stressing force F, is applied, by moving the upper jaw away from plane 1E.

Thirdly, the two contacts 4 and 5 advances, in opposite directions, to contact the sides $1D_L$ and $1D_R$ applying the secondary pre-stressing forces $F_{2L}$ and $F_{2R}$. Fourthly, the two contacts $4_L$ and $4_R$ move forward and backward, simultaneously, applying the two harmonic forces $F_{3L}$ and $F_{3R}$, with a phase angle of 180°, while their frequency is as close as practically possible to the selected natural frequency of the system.

Fifthly, an impulsive fracturing force $F_{41}$ is applied at the time instant $T_f$, causing a sudden increase of $F_1$ and, thus, fracturing the connecting rod. $T_f$ is determined first, by performing the tests that were described earlier.

An alternative to execute the last step is to apply a slow rate dynamic force within a period centered on the same time instant.

Although the preferred mode for carrying out this invention has been set forth in this specification, it is obvious that there are several alternative modes. One of them for instance, is to apply a harmonic force to the cap, in a direction that is perpendicular to the predetermined fracture plane.

While the present description of the process incorporates all of the aforementioned factors, eliminating the pre-stressing forces or either of them should not be construed as a departure from the scope of this invention. This is a valid option, especially, for small size connecting rods. In this case, the procedure that was described earlier should be followed, with an exception that is to skip the steps related to the omitted force or forces.

While particular embodiments of the invention have been disclosed, it is evident that many alternatives and modifications will be apparent to those skilled in the art in light of the forgoing description. Accordingly, it is intended to cover all such alternatives and modifications as fall within the spirit and broad scope of the appended claims.

What is claimed is:

1. A process for the fracture separation of a part having a cylindrical bore passing therethrough into a first portion and a second portion, the cylindrical bore having a central axis, the part having two opposed sides proximate to the intersection of a predetermined fracture plane passing through the cylindrical bore and the part, the process including the step of applying at least one fatigue force to at least one of the first portion and the second portion, said at least one fatigue force being applied to fracture the part into the first portion and the second portion so as to separate the first portion from the second portion substantially along said predetermined fracture plane, said at least one fatigue force being selected from the group consisting of:

i) a longitudinal cyclic force applied to one of the first portion and the second portion relative to the other of the first portion and the second portion, said longitudinal cyclic force being applied in a direction substantially perpendicular to said predetermined fracture plane, and ii) a lateral cyclic force applied to each of the opposed sides of the part, each of said lateral cyclic forces being applied along a substantially straight line that is substantially parallel to the predetermined fracture plane and substantially perpendicular to the central axis, where at any time instant, each of said lateral cyclic forces being substantially equal in magnitude and acting opposite in direction to one another; and applying a dynamic force to one of the first portion and the second portion relative to the other of the first portion and the second portion in a direction substantially perpendicular to said predetermined fracture plane.

2. A process as claimed in claim 1, wherein said at least one fatigue force is a harmonic force, the frequency of the harmonic forces is selected so as to achieve a resonance condition in said part.

3. A process as claimed in claim 1, including the step of applying a longitudinal pre-stressing force to one of the first portion and the second portion relative to the other of the first portion and the second portion, said longitudinal pre-stressing force being applied in a direction substantially perpendicular to said predetermined fracture plane.

4. A process as claimed in claim 1, including the step of applying a lateral pre-stressing force to each of the opposed sides of the part, each of said lateral pre-stressing forces being applied along a substantially straight line that is substantially parallel to the predetermined fracture plane and substantially perpendicular to the central axis, where at any time instant, each of lateral pre-stressing forces being substantially equal in magnitude and acting opposite in direction to one another.

5. A process as claimed in claim 1, wherein said part is a connecting rod, said first portion is a cap portion and said second portion is a rod portion.

6. A process as claimed in claim 1, wherein said at least one fatigue force is said longitudinal cyclic force applied to one of the first portion and the second portion relative to the other of the first portion and the second portion, said longitudinal cyclic force being applied in a direction substantially perpendicular to said predetermined fracture plane.

7. A process as claimed in claim 1, wherein said at least one fatigue force is said lateral cyclic force applied to each of the opposed sides of the part, each of said lateral cyclic forces being applied along a substantially straight line that is substantially parallel to the predetermined fracture plane and substantially perpendicular to the central axis, where at any time instant, each of lateral cyclic forces being substantially equal in magnitude and acting opposite in direction to one another.

* * * * *